United States Patent [19]

Crisafulli

[11] 4,175,916
[45] Nov. 27, 1979

[54] PUMP WITH STEEP-ANGLE HITCH AND UNIVERSAL DRIVE JOINT

[76] Inventor: Angelo J. Crisafulli, P.O. Box 1051, Glendive, Mont. 59330

[21] Appl. No.: 852,712

[22] Filed: Nov. 18, 1977

[51] Int. Cl.$^2$ .......................... F04B 17/06; F04B 35/06
[52] U.S. Cl. ..................................... 417/231; 280/789; 417/234
[58] Field of Search ................. 417/234, 231; 280/789

[56] References Cited

U.S. PATENT DOCUMENTS

| | | | |
|---|---|---|---|
| 2,214,677 | 9/1940 | North | 417/231 |
| 2,620,201 | 12/1952 | Brady | 280/789 X |
| 2,836,429 | 5/1958 | Kurka | 280/789 X |
| 3,008,422 | 11/1961 | Crisafulli | 417/231 |
| 3,371,614 | 3/1968 | Crisafulli | 417/231 X |

Primary Examiner—Carlton R. Croyle
Assistant Examiner—R. E. Gluck
Attorney, Agent, or Firm—Clarence A. O'Brien; Harvey B. Jacobson

[57] ABSTRACT

A pump supported from a wheeled trailer having a hitch connection with a tractor drawbar and a drive connection with the power take-off of the tractor with the pump including dual inlets enabling it to be backed into a ditch, sump, concrete canal, sewage lagoon, or the like. The hitch includes an elevated central portion defined by upwardly angulated portions rigidly connected at the center to facilitate the pump and its supporting frame and wheels being easily backed into and operated in relatively deep ditches. A drive shaft includes a universal joint supported at the apex of the angulated portions of the hitch so that the portion of the drive shaft connected to the tractor power take-off will be substantially in alignment with the power take-off on the tractor when the pump and its supporting frame and wheels are positioned in a deep ditch, sump, concrete canal, or the like.

8 Claims, 5 Drawing Figures

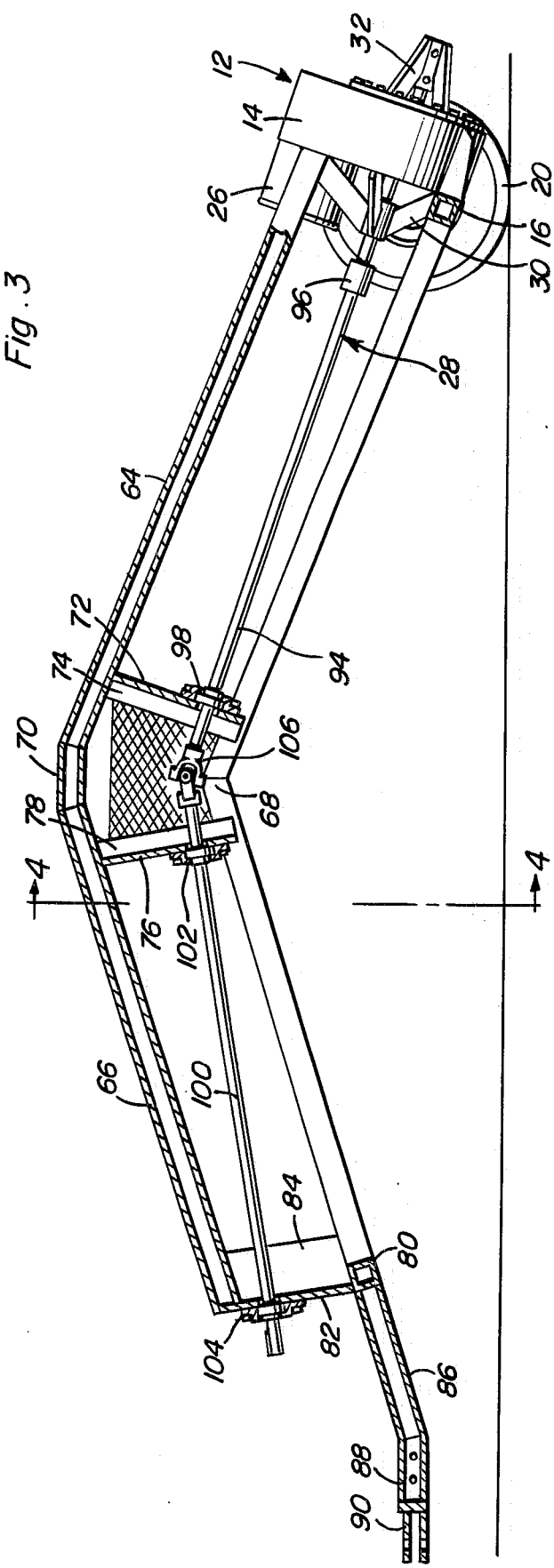
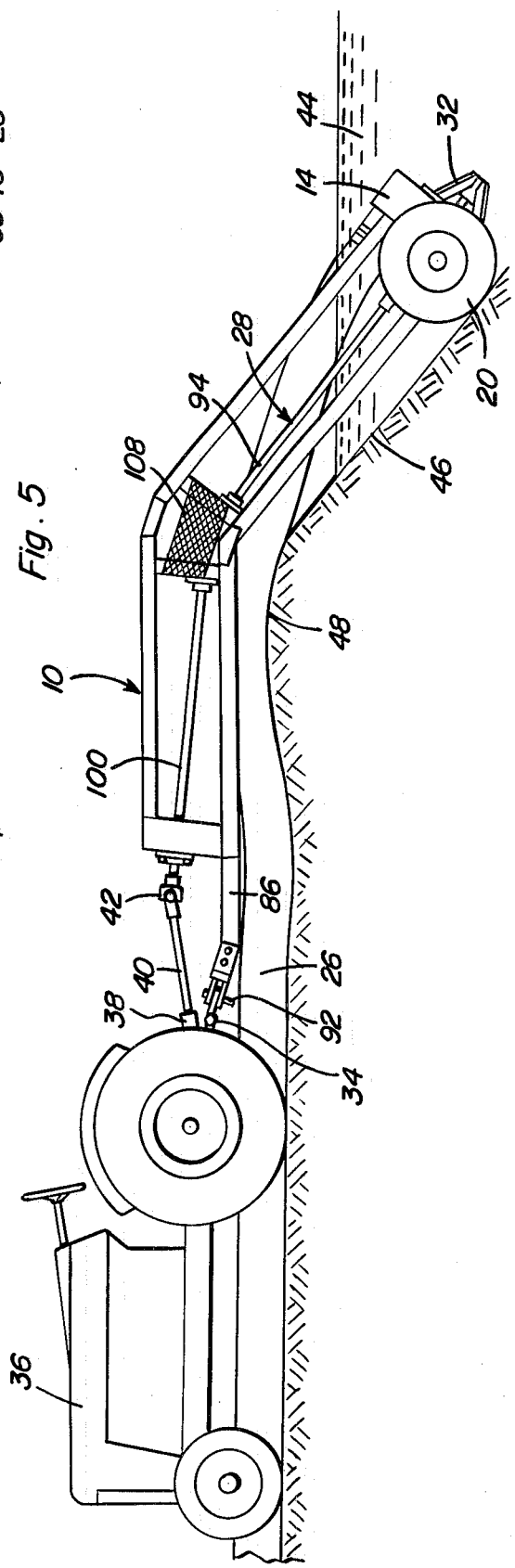

PUMP WITH STEEP-ANGLE HITCH AND UNIVERSAL DRIVE JOINT

BACKGROUND OF THE INVENTION

1. Field of the Invention

The present invention generally relates to portable pumps of the centrifugal type having dual inlets with the pump being supported on a supporting framework and wheels to enable it to be towed behind a tractor and backed into and submerged or partially submerged in the material being pumped with the impeller of the pump being driven from the tractor power take-off in which the hitch and drive shaft have upwardly angulated portions with the hitch including a rigid connection between the upwardly angulated portions and the drive shaft including a universal joint connecting the upwardly angulated portions.

2. Description of the Prior Art

Applicant's prior U.S. Pat. No. 3,371,614, issued Mar. 5, 1968, discloses a portable centrifugal pump having a dual inlet supported from a wheeled frame and provided with a hitch structure connected to the drawbar of a tractor with the pump impeller being driven by a drive shaft extending to and connected with the tractor power take-off. Other prior U.S. patents illustrating related structure are as follows:

| Patent Nos: | | |
|---|---|---|
| 2,214,677 | - | Sep. 10, 1940 |
| 2,744,465 | - | May 8, 1956 |
| 3,008,422 | - | Nov. 14, 1961 |
| 3,150,598 | - | Sep. 29, 1964 |
| 3,170,646 | - | Feb. 23, 1965 |
| 3,779,670 | - | Dec. 18, 1973 |
| 3,799,690 | - | Mar. 26, 1974 |
| 3,832,093 | - | Aug. 27, 1974. |

SUMMARY OF THE INVENTION

An object of the present invention is to provide a pump and supporting framework and supporting wheels with a steep-angle hitch which includes angulated portions in which the joint or apex between the angulated portions is above the remote ends of the high structure, together with a drive shaft having a universal joint or U-coupling in the drive shaft which is supported by bearing structures adjacent the apex or juncture between the angulated portions of the hitch.

Another object of the invention is to provide a pump having a hitch and drive shaft in accordance with the preceding object which facilitates the pump being backed into a deep ditch, canal, sump, or the like, having a steep incline on the bank or retaining wall so that the angulated portions of the hitch and drive shaft generally more closely conform with the contour of the steep bank and adjacent supporting surface without the pump and its supporting frame and wheels being cantilever supported by a central portion of the hitch which occurs frequently when a straight, elongated hitch or frame connected to a tractor drawbar is backed into a ditch, or the like, having a relatively steep bank.

A further object of the present invention is to provide a pump with steep-angle hitch in accordance with the preceding objects in which the hitch is in the form of an elongated frame having a generally triangular cross-sectional configuration with tubular frame members at the two lower corners and upper apex thereof for providing a rigid frame with the forward and rearward portions of the frame being angulated in relation to each other so that the central portion of the frame will be elevated above the end portions thereof when the end portions are disposed in substantially the same horizontal plane.

Still another object of the invention is to provide a pump with steep-angle hitch in accordance with the preceding objects in which the hitch and drive shaft assembly are relatively simple in construction, but facilitate use of the pump under more varied conditions which may be encountered.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a longitudinal, sectional view taken substantially upon a plane passing along section line 3—3 of FIG. 2 illustrating specific structural details of the steep-angle hitch and drive shaft with universal joint.

FIG. 5 is a side elevational view of the present invention illustrating the manner in which it facilitates use of the pump with a deep ditch or other area having a relatively steep bank or inclined surface adjacent the edge of the water into which the pump is backed.

DESCRIPTION OF THE PREFERRED EMBODIMENT

Figure 1:
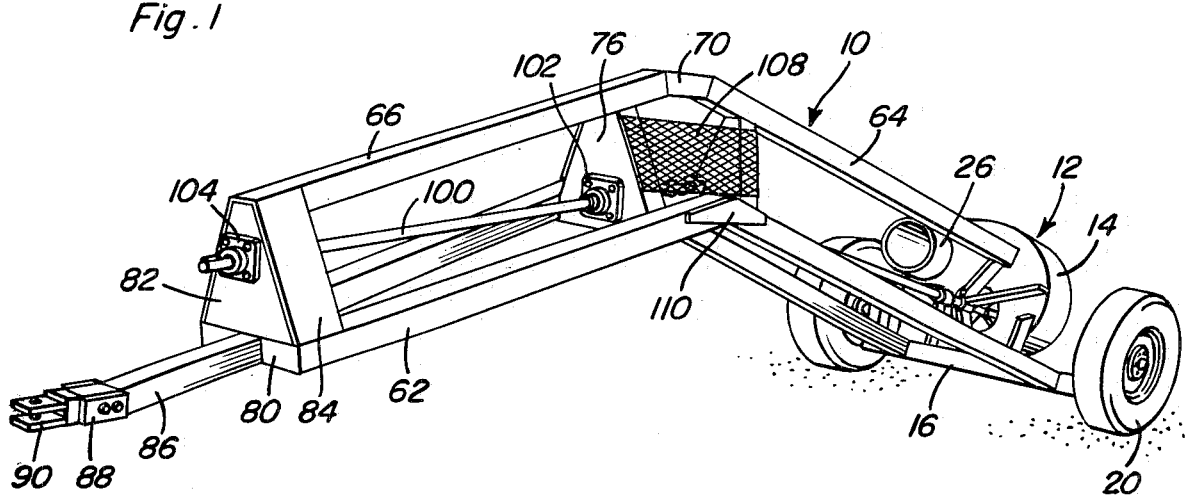
FIG. 1 is a perspective view of the pump with steep-angle hitch and universal coupling in the drive shaft of the present invention.

Referring now specifically to the drawings, the pump with steep-angle hitch and universal joint in the drive shaft is generally designated by numeral 10 and includes a portable pump generally designated by numeral 12 constructed in accordance with the centrifugal, dual inlet pump disclosed in detail in my prior U.S. Pat. No. 3,371,614 in which the pump housing 14 is supported from an axle structure 16 having offset end arms 18 rotatably journalling supporting wheels 20 with the pump housing 14 including forward and rearward inlets 22 and a discharge 24 tangentially related to a rotatable impeller within the housing 14 and facing forwardly for discharge of water being pumped through a pipe or tube 26. The impeller within the housing 14 is driven from a drive shaft 28 with the drive shaft and impeller being supported by forward support structures 30 and rearward support structures 32.

The pump with steep-angle hitch 10 is connected to a tractor drawbar 34 on a conventional farm tractor 36 and the drive shaft 28 is connected to the power take-off 38 of the tractor 36 through a short telescopic shaft 40 provided with a U-joint 42 at its rearward end for connecting with the drive shaft 28. When used with a body of water 44, such as in a ditch, canal, sump, or the like, having a relatively steeply inclined side or wall 46, a straight hitch frame frequently will fulcrum on or be cantilever supported from the edge 48 of the ditch. In situations of this nature, it is customary to back the tractor 36 to a point as close as possible to the upper edge 48 of the ditch so that the pump housing 14 can be submersed either completely or partially in the water 44. If the ditch is relatively narrow in width, the wheels 20 sometimes will engage the opposite wall or bank and in some instances, a risk is involved that the tractor will be accidentally backed into the ditch. In addition, when this condition occurs, the drive shaft to the pump is angled sharply with respect to the power take-off shaft of the tractor in a manner that excessive wear occurs in the normally provided universal drive joint or coupling.

Figure 2:
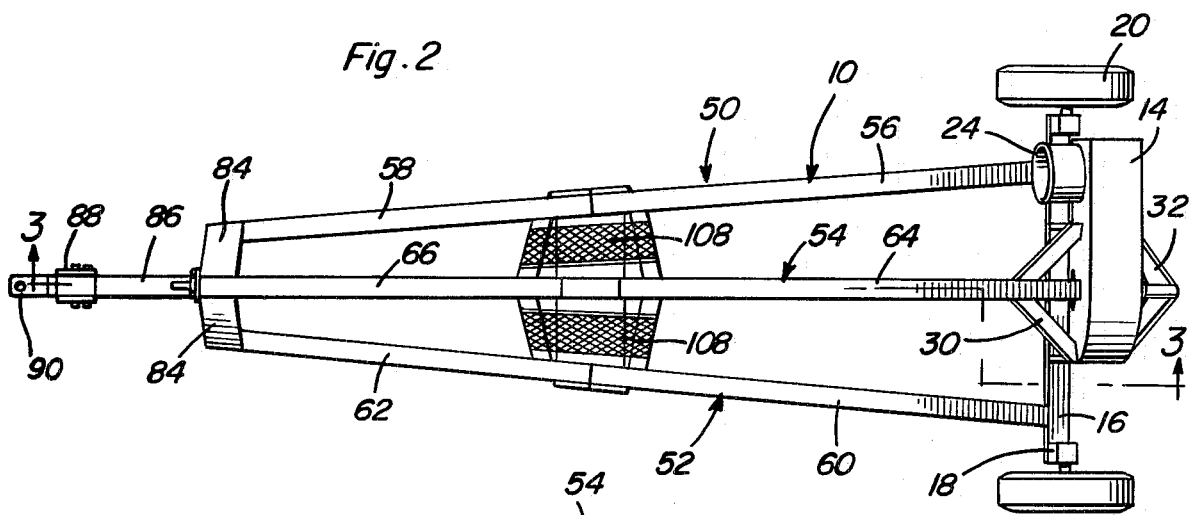
FIG. 2 is a top plan view of the construction of FIG. 1.
Figure 4:
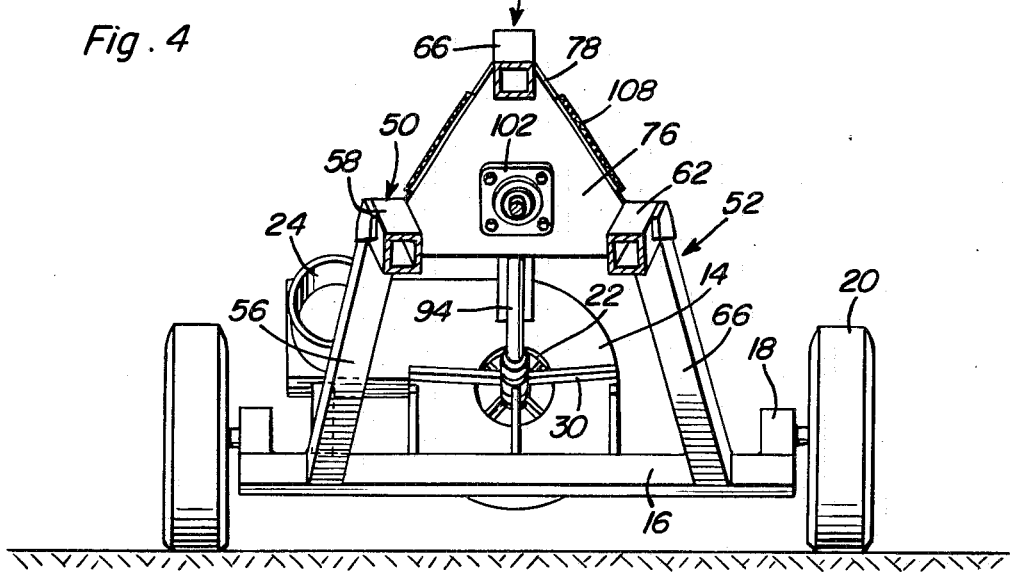
FIG. 4 is a transverse, sectional view taken substantially upon a plane passing along section line 4—4 of FIG. 3 illustrating the specific structural cross-sectional configuration and details of the steep-angle hitch frame.

The steep-angle hitch 10 includes three longitudinally extending frame members 50, 52 and 54 which are in the form of hollow tubular members or box members, or the like, which are oriented to define a triangular cross-sectional arrangement in which the two lower members 50 and 52 define a base of a triangle and the upper central member 54 defines the apex of a triangle as illustrated in FIG. 4. The rearward ends of the frame members 50 and 52 are rigidly affixed to the axle 16 and extend forwardly therefrom in a slightly converging manner, as illustrated in FIG. 2. The upper frame member 54 is rigidly affixed to the forward surface of the pump housing 14 above the inlet 22 and is substantially centrally disposed centrally of and above the forwardly converging members 50 and 52 as illustrated in FIG. 2 and substantially parallel to the horizontal plane of the frame members 50 and 52 as illustrated in FIG. 3.

The frame member 50 includes a rearward portion 56 and a forward portion 58 and likewise, the frame member 52 includes a rearward portion 60 and forward portion 62 and the frame member 54 includes a rearward portion 64 and a forward portion 66. The rearward portions 56 and 60 of the frame members 50 and 52 are angulated with respect to the forward portions 58 and 62 of the lower frame members with the juncture therebetween being designated by numeral 68 in FIG. 3 with the juncture 68 being located in a position above the remote ends of the frame members 50 and 52 so that the included angle between the rearward portions 56 and 60 and the forward portions 58 and 62 is an obtuse angle as illustrated in FIG. 3 with this obtuse angle generally conforming the frame members with the ground surface, the ditch bank or wall 46 and the edge 48 thereof, as illustrated in FIG. 5.

The top frame member 54 includes a short connecting portion 70 extending between the adjacent ends of the rearward portion 64 and the forward portion 66 thereof to reduce the overall height of the apex of the steep-angle hitch 10. Rigidly interconnecting the ends of the rearward portions remote from the pump housing 14 is a plate 72 generally of triangular configuration and which includes side flanges 74 to rigidly interconnect the forward ends of the rearward portions of the frame members. Likewise, the rearward ends of the forward portions of the frame members are interconnected by a plate 76 having projecting side flanges 78 thereon. The forward ends of the forward portions 58 and 62 of the lower frame members 50 and 52 are interconnected by a transverse frame member 80 and an end plate 82 interconnects the transverse frame member 80, the forward ends of the frame members 50 and 52 and the forward end of the frame member 54, as illustrated in FIG. 3. Also, side plates 84 interconnect the forward end of the forward portion 66 of the frame member 54 and the outer edges of the forward portions 58 and 62 of the lower frame members 50 and 52. Extending forwardly from the transverse frame member 80 is a tongue 86 having an angulated forward end 88 provided with a clevis 90 at the forward end for receiving the tractor drawbar and a connecting pin 92 for pivotally connecting the steep angle hitch to the tractor.

The drive shaft 28 includes a rearward section 94 having a coupling 96 therein for connection with the pump impeller with the rearward end of the drive shaft section 94 being supported by the support assembly 30. The forward end portion of the rearward section 94 of the drive shaft is supported by a bearing and mounting block assembly 98 attached to the plate 72. The drive shaft 28 also includes a forward section 100 having its rearward end journaled and supported by a bearing and mounting block 102 connected with the plate 76 and its forward end journaled by a bearing and mounting block 104 attached to the plate 82 as illustrated in FIG. 3. The forward end of the forward section 100 of the drive shaft is provided with a splined, keyed or other connection with the universal joint 42. The adjacent ends of the rear section 94 and forward section 100 of the drive shaft which are disposed between the plates 72 and 76 as illustrated in FIG. 3 are interconnected by a universal joint or coupling 106 with the included angle between the sections of the drive shaft being closer to a straight line condition than the included angle between the frame members inasmuch as the universal joint 106 is closer to the juncture 68 than it is to the connecting member 70 at the apex of the steep-angle hitch. A wire mesh or screen protective panel 108 is affixed to the flanges 74 and 78 on each side of the steep-angle hitch to substantially enclose the universal joint or U-joint 106 and to prevent accidental contact with the U-joint when it is rotating. A reinforcing gusset plate 110 is provided at the juncture 68 between the forward and rearward sections of the bottom frame members 50 and 52 to rigidify the apex of the steep-angle hitch 10.

With the steep-angle hitch of the present invention, the pump can be simply and easily operated in deep ditches, sumps, concrete canals, or the like, for use in irrigation, flood control and various other uses where a portable, submersible, high volume pump of this type can be effectively employed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a portable pump supported on an elongated rigid frame having ground engaging wheels at the rear thereof and means at the front for connecting the frame in trailing relation to a tractor or other towing vehicle, a drive shaft connected to the pump and being journaled on the frame and driven from the towing vehicle whereby the pump can be moved into a body of material to be pumped by following the contours of the retaining surface for the material to be pumped, that improvement comprising said elongated frame having a rear section attached to the pump and a front section extending toward the towing vehicle with the front and rear sections being angulated in relation to each other and joined at the center with the central portion of the frame being elevated above the end portions thereof to enable the supporting wheels to follow the retaining surface for the material to be pumped as the pump is moved thereinto, the area of the frame below the front and rear sections and the elevated central portion being free of obstructions, said drive shaft including a universal coupling at the elevated portion of the frame, said frame including vertically spaced bottom and top frame members, each frame member including a rear portion and a front portion joined together in angular relation with the included angle below the joined portions being a shallow obtuse angle, said universal coupling being disposed closer to the bottom of the frame than the top whereby the drive shaft defines a more obtuse angle than the frame members.

2. In a portable, submersible pump supported by ground engaging means in trailing relation to a tractor or other towing vehicle and driven from the towing vehicle whereby the pump can be moved rearwardly into a body of material to be pumped by following the contours of the retaining surface for the material to be pumped, that improvement comprising a steep-angle hitch extending from the pump to the towing vehicle, said hitch including a rigid, elongated frame having a rear section attached to the pump and a front section connected with the towing vehicle with the front and rear sections being angulated in relation to each other and joined at the center with the central portion of the hitch being elevated above the end portions thereof for conforming with the retaining surface for the material to be pumped and an adjacent supporting surface, said hitch including a pair of bottom frame members and a top frame member with the top frame member being located centrally of and above the bottom frame members to define a generally triangular cross-sectional configuration, each frame member including a rear portion and a front portion joined together in angular relation with the included angle below the joined portions being obtuse.

3. The structure as defined in claim 2 wherein the forward ends of the frame members are rigidly interconnected by a triangular plate, the rearward ends of the frame members being rigidly connected with the pump, the adjacent ends of the rearward and forward portions of the frame members being rigidly connected by triangular plates, and a drive shaft with a universal coupling therein for the pump rotatably journaled from the plates with the adjacent plates defining an area receiving said universal coupling in the drive shaft.

4. The structure as defined in claim 3 wherein the upwardly converging sides of the adjacent plates on each side of the universal coupling are provided with a protective panel to preclude easy access to the universal coupling in the drive shaft.

5. The structure as defined in claim 2 wherein said frame members are of tubular construction with the two bottom frame members converging forwardly and being interconnected by a front frame member, a forwardly extending tongue rigid with the front frame member and including a hitch means for connection with a drawbar of the towing vehicle.

6. The structure as defined in claim 4 wherein said adjacent plates include lateral side edge flanges, said protective panels being mesh material affixed to said flanges, each of said plates including a bearing and mounting block for the drive shaft oriented adjacent the bottom of the plates whereby the included angle at the universal coupling will not be as sharp as the included angle at the juncture between the frame portions.

7. The structure as defined in claim 6 wherein said frame members are of tubular construction with the two bottom frame members converging forwardly and being interconnected by a front frame member, a forwardly extending tongue rigid with the front frame member and including a hitch means for connection with a drawbar of the towing vehicle, said tubular frame members being box members, the adjacent ends of the portions of the upper frame member being connected by a short connecting member of the same construction as the frame members and functioning to truncate the apex of the hitch for reducing the over-all height thereof.

8. In a portable pump supported on an elongated rigid frame having ground engaging means at the rear thereof and means at the front for connecting the frame in trailing relation to a tractor or other towing vehicle, a drive shaft connected to the pump and being journaled on the frame and driven from the towing vehicle whereby the pump can be moved into a body of material to be pumped by following the contours of the retaining surface for the material to be pumped, that improvement comprising said elongated frame having a rear section connected with the pump and a front section adapted to be connected articulately to the towing vehicle with the front and rear sections being angulated in relation to each other and joined at the center with the central portion of the frame being elevated above the remote end portions of the front and rear sections to enable the supporting means to follow the retaining surface for the material to be pumped as the pump is moved thereinto, the area of the frame below the front and rear sections and the elevated central portion being free of obstructions throughout the length thereof, said drive shaft including a universal coupling at the elevated portion of the frame, said frame including a plurality of longitudinally continuous frame members, one of said frame members being disposed below the drive shaft and universal coupling and one of said frame members being disposed above the drive shaft and universal coupling, said drive shaft being rotatably supported adjacent the front, rear and central portions thereof.

* * * * *